United States Patent
Polaganga et al.

(10) Patent No.: US 11,979,777 B2
(45) Date of Patent: May 7, 2024

(54) SYSTEM AND METHOD FOR OPTIMIZING USE OF WIRELESS COMMUNICATION PROTOCOLS

(71) Applicant: T-Mobile Innovations LLC, Overland Park, KS (US)

(72) Inventors: Roopesh Kumar Polaganga, Bothell, WA (US); Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 182 days.

(21) Appl. No.: 17/553,150

(22) Filed: Dec. 16, 2021

(65) Prior Publication Data
US 2023/0199572 A1    Jun. 22, 2023

(51) Int. Cl.
*H04W 36/00* (2009.01)
*H04W 36/12* (2009.01)

(52) U.S. Cl.
CPC ... *H04W 36/0022* (2013.01); *H04W 36/0058* (2018.08); *H04W 36/12* (2013.01)

(58) Field of Classification Search
CPC ......... H04W 36/0022; H04W 36/0058; H04W 36/12; H04W 36/14
See application file for complete search history.

(56) References Cited

U.S. PATENT DOCUMENTS

| | | | |
|---|---|---|---|
| 2015/0296423 A1* | 10/2015 | Zhang | H04W 36/245 455/436 |
| 2018/0070279 A1* | 3/2018 | Jaldén | H04W 36/24 |
| 2018/0124661 A1* | 5/2018 | Tsai | H04W 36/00835 |
| 2022/0201575 A1* | 6/2022 | Oh | H04L 65/1016 |
| 2022/0338085 A1* | 10/2022 | Zong | H04W 36/305 |
| 2023/0118064 A1* | 4/2023 | Bhowmik | H04W 24/04 455/422.1 |
| 2023/0189089 A1* | 6/2023 | Xu | H04W 36/0033 370/332 |

* cited by examiner

*Primary Examiner* — Luat Phung
(74) *Attorney, Agent, or Firm* — Shook, Hardy & Bacon L.L.P.; Elena S McFarland

(57) ABSTRACT

Systems and methods are provided for optimizing use of wireless communication technologies for a UE. The method can include determining that the UE has established a first wireless communication link to a first node that can use both a first and a second wireless communication protocol, then determining whether, prior to connecting to the first node, the UE was previously connected to a second node that only utilizes the first wireless communication protocol (e.g., standalone 5G). If the UE was previously connected to the second node and moved to the first node because of fallback or handover procedures, a second communication link is established between the UE and the second node without analyzing single information corresponding to the UE.

14 Claims, 4 Drawing Sheets

SYSTEM AND METHOD FOR OPTIMIZING USE OF WIRELESS COMMUNICATION PROTOCOLS

BACKGROUND

In telecommunication networks, user equipment (UE) can attach to a node via handover procedures or during fallback procedures. Some network operators deploy standalone-based 5G networks while utilizing legacy long term evolution (LTE) networks for seamless voice services using evolved packet system (EPS) fallback mechanisms. Fallback occurs, for example, between a 5G standalone (SA) network and an LTE node or an LTE antenna array of a 5G non-standalone (NSA) network in situations where the 5G SA network cannot yet handle the requested services. Some requested services that can automatically trigger such fallback can include, for example, emergency 911 services and voice services (as opposed to data services which could be provided via the 5G SA network). Handovers to nodes and/or layers of the LTE network can occur based on measurements performed by the UE, such as loss of signal strength.

Traditionally, when attaching to an LTE node that is configured for 5G NSA uses, the UE and/or the LTE node is configured for only one of the following two scenarios: blind-attach or measurement report-based attachment. With a blind-attach, the UE automatically attaches (via the LTE node) to a new radio (NR) node without analyzing any measurements. However, blind-attach methods can cause undesired battery drain for the UEs, particularly in situations where attaching to the NR node is not as advantageous or not needed. With measurement report-based attachment, a measurement report from the UE is always referenced first to determine if only the LTE node should be used or if the LTE node can serve as the master node and the NR node can serve as the secondary node. While waiting for this measurement report to be processed, there can be a significant throughput delay perceived by the user.

SUMMARY

The present disclosure is directed, in part, to systems and methods for optimizing telecommunications network user equipment (UE) connections. For instance, aspects described herein optimize a UE's communication with a node by allowing for a UE to establish a second communication link with a second node that utilizes both a first and a second wireless communication protocol (e.g., LTE and 5G) when the UE moved to the second node from a first node because of a fallback or handover procedure. In aspects, this process may occur without the node analyzing signal information associated with the UE, such as from a measurement report. When the reason for the move from the first node to the second node is not because of a fallback or handover procedure, a measurement report corresponding to the UE may be obtained to determine whether to establish a second communication link between the UE and the second node.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
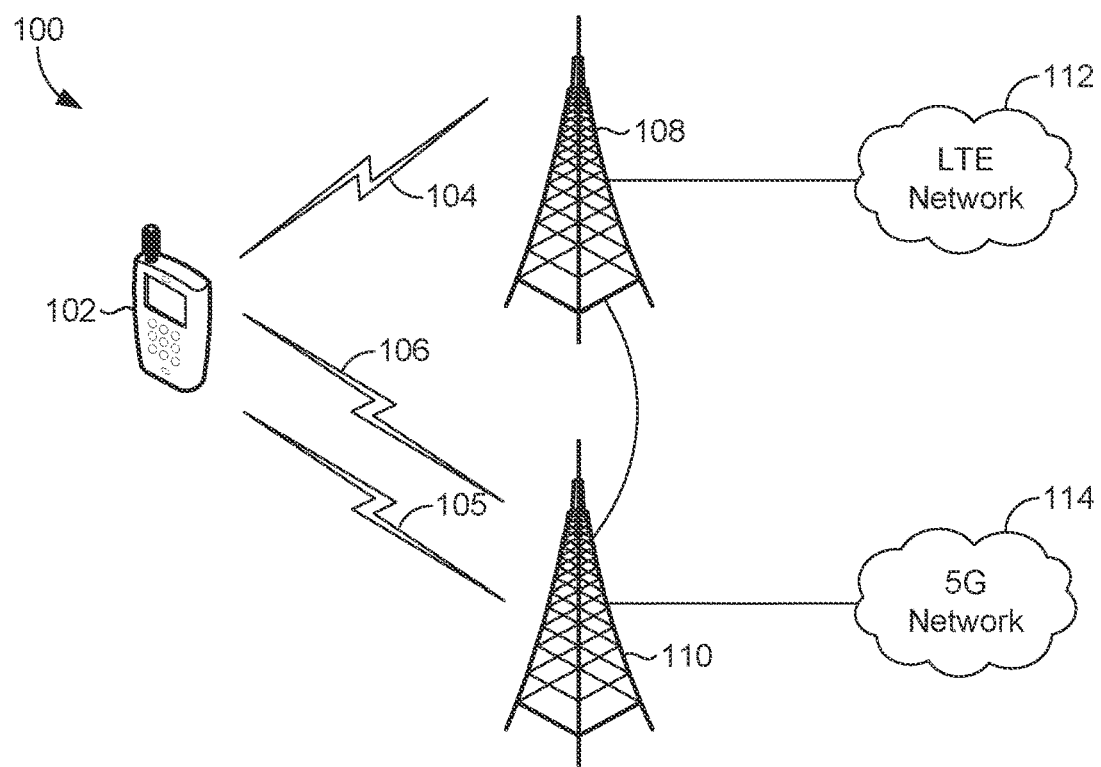
FIG. 1 depicts a diagram of an exemplary system suitable for use in implementations of the present disclosure, sharing data in accordance with aspects herein.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

By way of background, in telecommunications networks, UE may attach to a node via handover procedures or during fallback procedures. As defined herein, the UE can be a cellular phone, a mobile phone, a smart phone, or other electronic devices operable to communicate via telecommunication networks. Some telecommunications network operators deploy standalone-based 5G networks while utilizing legacy long term evolution (LTE) networks for seamless voice services using evolved packet system (EPS) fallback mechanisms.

Fallback occurs, for example, between a 5G standalone (SA) node and an LTE node or an LTE antenna array in situations where the 5G SA network cannot yet handle the requested services. Some requested services that can automatically trigger such fallback can include, for example, emergency 911 services and voice services (as opposed to data services which could be provided via the 5G SA network). Another embodiment in which fallback can occur is when the UE experiences 5G coverage issues. Likewise, handovers to other nodes and/or antenna arrays of the LTE network can occur based on measurements performed by the UE, such as when signal strength becomes too weak. The fallback or handover procedures can include, for example, evolved packet system fallback (ESPFB) procedures and/or inter radio access technology handover (IRATHO) procedures.

Traditionally, when attaching to an LTE node (e.g., target LTE layer) that is configured for 5G non-standalone (NSA) uses, the UE and/or the LTE node is configured for only one of the following two scenarios: blind-attach or measurement report-based attachment. In the first of these two scenarios, blind-attach, the UE automatically attaches (via the LTE node) to a new radio (NR) node (also referred to as a target NR layer). That is, the target LTE layer or LTE node serves as a master node and the NR node serves as a secondary node. One disadvantage is that if the signal strength for connecting to the NR node is not strong enough, such as at a cell edge, the UE can experience a ping-pong effect where the signal cuts in and out, which can drain the UE battery and thus hurt the customer experience. Furthermore, this can lead to inefficiencies and battery drain when the UE attaches to the NR node even though it is not actually needed (e.g., data not in use at that time).

In the second scenario, a measurement report from the UE is always referenced first to determine if only the LTE node should be used or if the LTE node can serve as the master node and the NR node can serve as the secondary node. The measurement report can indicate items such as whether or not the signal strength is sufficient to use the NR node as the secondary node. While waiting for this measurement report to be processed, there can be a significant throughput delay perceived by the user. So, for example, if a UE user is downloading a movie and receives a call, the downloading of the movie can still occur in the background. However, the throughput gets interrupted due to the measurement, which can also hurt the customer experience.

Thus, for an improved customer experience, a hybrid approach is described herein. Specifically, embodiments disclosed herein include a method of choosing either blind attach or measurement report-based attachment depending on specific triggers (e.g., based on UE's incoming cause codes). If the UE is attaching to the node by way of a fallback or handover procedure from a 5G SA node or network, then the blind attach method is used. For example, if the UE receives a voice call, utilizes emergency (e.g., 911) services, or if coverage or resources are lacking to use SA, a fallback can be triggered. Thus, the cause of the attachment to the LTE node can be identified as a fallback procedure, in which case a blind attach is used to add the NR node as a secondary node. Otherwise, if the UE is attaching to the LTE node for other reasons (such as a fresh attach), the measurement report is used to determine if LTE-only should be used or if the NR node should attach to the UE as a secondary node, with the LTE node serving as a master node. This can be based on signal strength or other various measurements in the measurement report from the UE.

Using blind attach only when the cause codes indicate that NR was in use prior to the interrupting event (e.g., a phone call) that caused the fallback to the LTE node is advantageous because the odds are that the same NR that was utilized prior to such an interrupting event will continue to be available at that time and location. The odds of the NR not being needed at that time or ping-ponging at a network edge are lower in those scenarios. Likewise, in other situations where the cause code does not necessarily indicate immediately-prior use of NR or data and where the signal strength allowing for use of NR is unknown, it is more advantageous to use the measurement report from the UE to make an appropriate determination as to whether NR is really needed as a secondary node at that time.

The term "new radio" or "NR" as referred to herein refers to 5G NR, which is a radio access technology (RAT) that uses frequency bands in two frequency ranges: a first band (FR1) within 410 MHz-7125 MHz and a second band (FR2) within 24250 MHz-52600 MHz. 5G NR can depend on existing 4G LTE infrastructure in NSA mode and/or 5G core network in SA mode. NSA mode refers to an option of 5G NR deployment that depends on a control plane of an existing 4G LTE network for control functions. Conversely, SA mode refers to using 5G cells for both signaling and information transfer. It can include 5G Packet Core architecture instead of relying on 4G Evolved Packet Core, thus allowing deployment of 5G without the LTE network.

The present disclosure is generally directed to a system and method for optimizing telecommunications network UE connections. The method can include determining that the UE is connected to a first node configured to use both a first wireless communication protocol (e.g., NR) and a second wireless communication protocol (e.g., LTE). Specifically, in some embodiments, the first wireless communication protocol is 5G new radio (NR) and the second wireless communication protocol is long term evolution (LTE). For example, the first node can be configured according to non-standalone (NSA) 5G protocol or NSA mode, such that the LTE serves as a master wireless communication protocol and the 5G serves as a secondary wireless communication protocol.

Then the method can include determining whether, prior to connecting to the first node, the first UE was previously connected to a second node that only utilizes the first wireless communication protocol (e.g., NR) or whether, prior to connecting to the first node, the first UE was not previously connected to the second node (e.g., non-standalone 5G, LTE, or fresh attach). This can be determined, for example, with a step of monitoring for an incoming cause code from the first UE, such as cause codes that indicate a fallback or handover procedure has occurred. If the first UE was previously connected to the second node, the first UE is automatically assigned to the first wireless communication protocol. The first UE can be determined to have previously been connected to the second node if the incoming cause code indicates at least one of a voice call, an emergency services call, lack of adequate coverage of NR, and/or lack of resources to use NR.

Otherwise, a measurement report is obtained from the first UE to determine whether to assign the first UE to the first wireless communication protocol (e.g., NR) or the second wireless communication protocol (e.g. LTE). This measurement report option is used, for example, if the first UE is determined to have not previously been connected to the second node. This can be determined based on an absence of particular cause codes related to fallback or handover procedures associated with the first wireless communication protocol and/or an indication of a fresh attach of the first UE to the first node. In some embodiments, the measurement report received from the first UE indicates strength of signal.

Accordingly, in one aspect, a method is provided for optimizing use of wireless communication protocols. The method comprises determining that a first user equipment (UE) has established a first wireless communication link to a first node that uses a first wireless communication protocol, determining that the first UE moved from a second node that uses only the second wireless communications protocol to the first node based on fallback or handover procedures, and based on determining that the first UE moved from the second node to the first node, in addition to the first wireless communication link, establishing a second wireless communication link between the first UE and the second node without analyzing signal information from the first UE.

In a second aspect, a non-transitory computer-readable media comprising executable instructions is provided that, in response to execution, cause a network device comprising one or more processors to perform operations. These operations comprise determining that a first user equipment (UE) has established a first wireless communication link to a first node that uses a first wireless communication protocol, determining that the first UE moved from a second node that uses only the second wireless communications protocol to the first node based on fallback or handover procedures, and based on determining that the first UE moved from the second node to the first node, in addition to the first wireless communication link, establishing a second wireless communication link between the first UE and the second node without analyzing signal information from the first UE.

In a third aspect, a method is provided for optimizing use of wireless communication protocols. The method comprises determining that a first user equipment (UE) has established a first wireless communication link to a first node that uses a first wireless communication protocol, and determining whether the first UE moved from a second node that uses only the second wireless communications protocol to the first node based on fallback or handover procedures. If it is determined that the first UE moved from the second node to the first node based on fallback or handover procedures, the method comprises establishing a second wireless communication link between the first UE and the second node without analyzing signal information from the first UE. But if it is determined that the first UE did not move from the second node to the first node based on fallback or handover procedures, the method comprises analyzing a measurement report associated with the first UE prior to determining whether to establish a second wireless communication link between the first UE and the second node.

Embodiments herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random-Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 700 shown in FIG. 7. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more user equipment (UE). The network may comprise one or more base stations, one or more cell sites (i.e., managed by a base station), one or more cell towers (e.g., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (e.g., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" or "node" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO (massive multiple-input/multiple-output)) as discussed herein.

The terms "user equipment," "UE," and/or "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies (e.g., Long-Term Evolution (LTE)), current UE capable of using 5G and lacking backward compatibility with prior access technologies, and legacy UE that is not capable of using 5G.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such. Along similar lines, certain UE are described herein as being "priority" UE and non-priority UE, but it should be understood that in certain implementations UE may be distinguished from other UEs based on any other different or additional features or categorizations (e.g., computing capabilities, subscription type, and the like).

The terms "servicing" and "providing signal coverage," "providing network coverage," and "providing coverage," are interchangeably used to mean any (e.g., telecommunications) service(s) being provided to user devices. Moreover, "signal strength", "radio conditions," "level of coverage," and like, are interchangeably used herein to refer to a connection strength associated with a user device. For example, these terms may refer to radio conditions between a user device and a beam providing coverage to the user device. In particular, the "signal strength," "level of coverage," and like may be expressed in terms of synchronization signal (SS) measurements/values and/or channel state information (CSI) measurements/values. In the context of 5G, signal strength may be measured by user devices, which may communicate the signal strength to the cell site and/or the beam management system disclosed herein. In particular, a user device may report various measurements. For example, a user device may provide signal strength as certain synchronization signal (SS) measurements, such as a SS reference signal received power (SS-RSRP) value/measurement, a SS Reference Signal Received Quality (SS-RSRQ) value/measurement, a SS signal-to-noise and interference ratio (55-SINR) value/measurement, and/or the like. Alternatively or additionally, in some embodiments, signal strength may also be measured and provided in terms of channel state information (CSI) values.

Turning now to FIG. 1, a diagram is depicted of an exemplary network environment 100 suitable for use in implementations of the present disclosure. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

Network environment 100 provided service to one or more user devices, such as exemplary user device 102. In some embodiments, the network environment 100 may be a telecommunication network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. (Example components and devices are discussed below with respect to FIG. 5.) Those devices and components may provide connectivity in a variety of implementations. In addition, the network environment 100 may be utilized in a variety of manners, such as a single network, multiple networks, or as a network of networks, but, ultimately, is shown as simplified as possible to avoid the risk of confusing other aspects of the present disclosure.

The network environment 100 may include or otherwise may be accessible through one or more of nodes 108 or 110. Nodes 108 and 110 may include one or more antennas, base transmitter stations, radios, transmitter/receivers, digital signal processors, control electronics, GPS equipment, power cabinets or power supply, base stations, charging stations, and the like. In this manner, nodes 108 and 110 may provide a communication link between the one or more user devices 102 and any other components, systems, equipment, and/or devices of the network environment 100 (e.g., the beam management system). The base station and/or a computing device (e.g., whether local or remote) associated with the base station may manage or otherwise control the operations of components of nodes 108 and 110. Example components that may control the operations of components of nodes 108 and 110 are discussed below with respect to FIG. 5.

Nodes 108 and 110 may include a Next Generation Node B (e.g., gNodeB or gNB) or any other suitable node structured to communicatively couple to the user device 102. Nodes 108 and 110 may correspond to one or more frequency bands. A frequency is the number of times per second that a radio wave completes a cycle. The frequency band may include a frequency range (e.g., a lower frequency and an upper frequency) within which the user device(s) may connect to the network environment such as, but not limited to, a telecommunication network or a portion thereof. The frequency range may be measured by the wavelength in the range or any other suitable wave properties.

In some embodiments, the user device 102 may take the form of a wireless or mobile device capable of communication via the network environment 100. For example, the user device 102 may take the form of a mobile device capable of communication via a telecommunication network such as, but not limited to, a wireless telecommunication network. In this regard, the user device 102 may be any mobile computing device that communicates by way of a network, for example, a 3G, CDMA, 4G, LTE, WiMAX, 5G, 6G or any other type of network. The network environment 100 may include any communication network providing voice and/or data service(s), such as, for example, a 1× circuit voice, a 3G network (e.g., Code Division Multiple Access (CDMA), CDMA 2000, WCDMA, Global System for Mobiles (GSM), Universal Mobile Telecommunications System (UMTS), a 4G network (LTE, Worldwide Interoperability for Microwave Access (WiMAX), High-Speed Downlink Packet Access (HSDPA)), or a 5G network.

In addition to user device 102 and nodes 108 and 110, network environment 100 includes communications links 104, 105, and 106, LTE network 112 and 5G network 114. In network environment 100, user device 102 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 500) that communicates via wireless communications with nodes 108 and/or 110 in order to interact with a public or private network.

In some implementations, nodes 108 and 110 are configured to communicate with user devices, such as user device 102 and other devices that are located within the geographical area, or cell, covered by the one or more antennas of nodes 108 and 110. Nodes 108 and 110 may include one or more base stations, nodes, base transmitter stations, radios, antennas, antenna arrays, power amplifiers, transmitters/receivers, digital signal processors, control electronics, GPS equipment, and the like. In one aspect, at least one of node 108 or node 110 is a gNodeB, while in another aspect, at least one of node 108 or node 110 is an eNodeB. In particular, user device 102 may communicate with nodes 108 and/or 110 according to any of one or more communication protocols, in order to access the network.

Node 108, in an aspect, is an eNodeB, providing access to the LTE network 112. Node 110, in one aspect, is a gNodeB, providing access to the 5G network 114. As mentioned, in an NSA architecture, the 5G Radio Acess Network and the New Radio (NR) interface are used in conjunction with the existing LTE and EPC infrastructure Core Network, which allows the NR technology to be available without network replacement. NSA is also known as E-UTRA-NR Dual Connectivity (EN-DC). In NSA architecture, the NSA anchors the control signaling of 5G Radio Networks to the 4G Core such that the 5G service is built over an existing 4G network. SA architecture, on the other hand, is where the NR is connected to the 5G Core Network. SA allows complete independent operation of a 5G service without any interaction with an existing core. Thus, control signaling in SA does not depend on the 4G network at all.

In an exemplary aspect, UE 102 may have an established communication link 106 with node 110, allowing the UE 102 to access the 5G network 114. In this instance, node 110 is a SA gNodeB, acting independently of the LTE network 112. In the instance where UE 102 either experiences a handover or a fallback from node 110 to node 108, communication link 104 is established to allow UE 102 to communicate with node 108. In aspects, because UE 102 experienced a handover or a fallback from node 110 to node 108, communication link 105 may be automatically or blindly established such that node 110 becomes the secondary node, or secondary cell group (SCG) for the NSA configuration, where node 108 is the master cell group (MCG). Without the UE 102 having moved from node 110 to node 108 based on a fallback or handover, the establishment of the communication link 105 would not have been blindly done, as a measurement report corresponding to the UE 102 would have been sent to node 108 and analyzed to determine whether communication link 105 should be established.

Having described the network environment 100 and components operating therein, it will be understood by a person having ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by a person having ordinary skill in the art that the number, interactions, and physical location of components illustrated in FIG. 1 are examples, as other methods, hardware, software, components, and devices for establishing one or more communication links between the various components may be utilized in implementations of the present disclosure. It will be understood to a person having ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2:
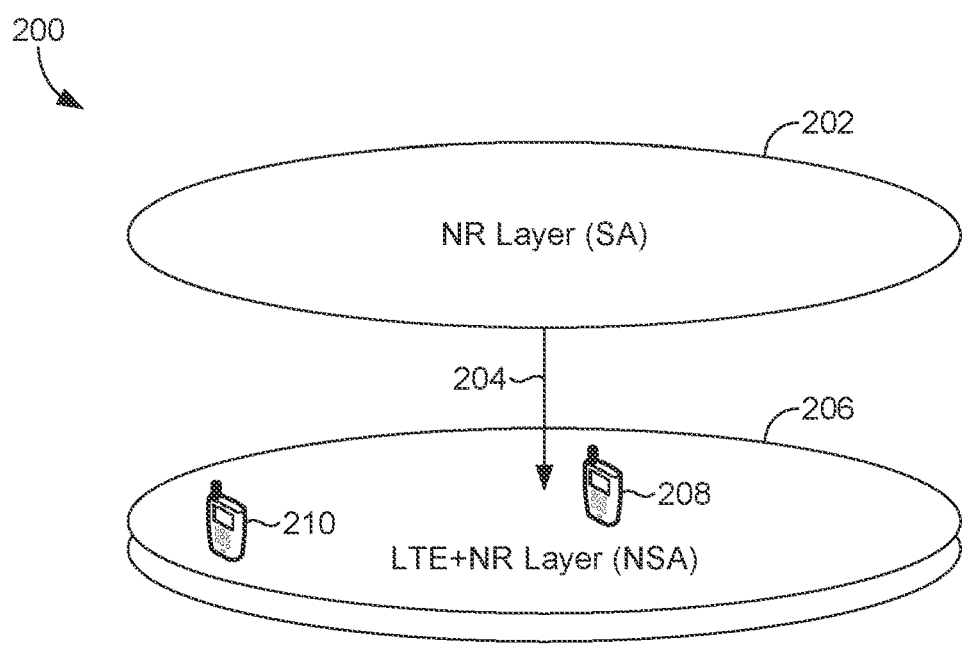
FIG. 2 depicts a diagram of a UE moving from a first node to a second node because of a fallback or handover procedure, in accordance with aspects herein.

Referring now to FIG. 2, FIG. 2 provides an exemplary system 200 comprising one or more UEs, such as a first UE 208 and a second UE 210, NR layer 202, LTE+NR layer 206, and item 204 representing a fallback or handover procedure for UE 208 from NR layer 202 to LTE+NR layer 206. In some embodiments, the system 200 can further include various components of an LTE network or any first network and/or a 5G network or any second network. In some embodiments, NR layer 202 may be associated with a gNodeB that is able to provide 5G services in an SA architecture, thus not requiring any LTE services to operate. As such, NR layer 202 may represent an SA architecture. NR+LTE layer 206 may be associated with an eNodeB, and may be configured to communicate using both LTE and 5G. For example, NR+LTE layer 206 may represent an NSA architecture, where LTE is the primary or MCG and NR is the SCG. As shown in FIG. 2, UE 210 may have attached directly to LTE+NR layer 206. But UE 208, as shown, has moved from NR layer 202 to LTE+NR layer 206 because of a handover or fallback procedure. Therefore, aspects herein provide that a communication link is automatically or blindly established between UE 208 and a node (e.g., gNodeB) associated with the NR layer of LTE+NR layer 206 to create an NSA configuration.

Figure 3:
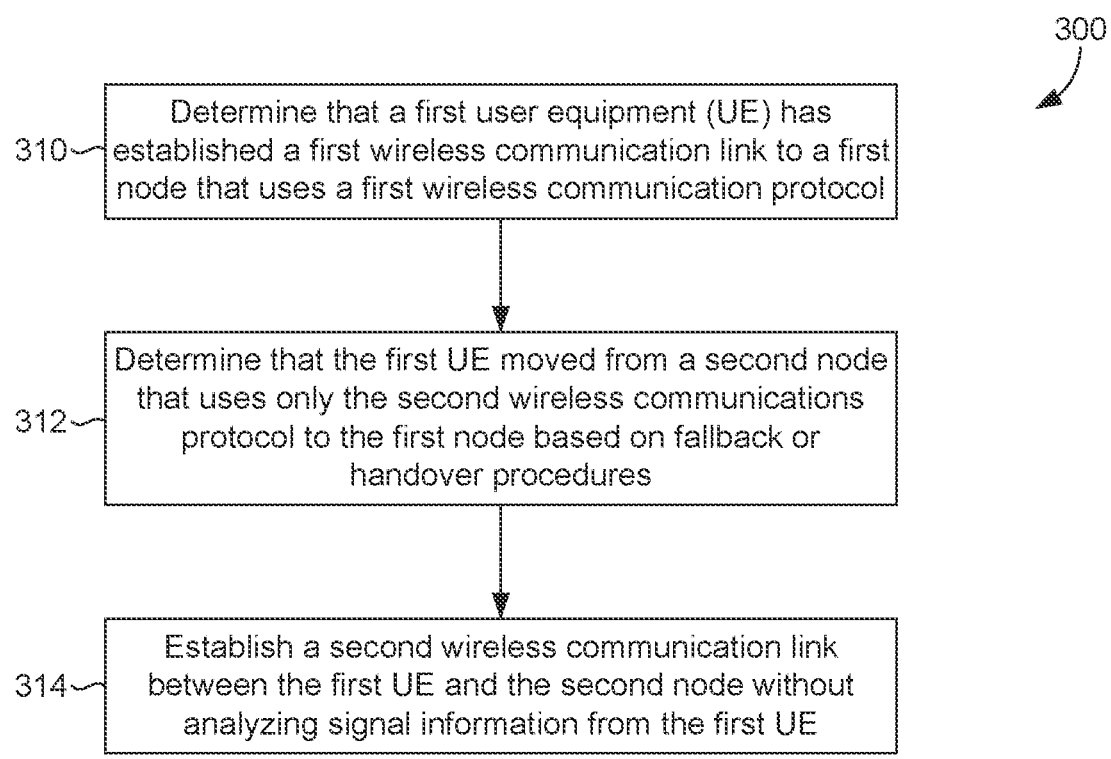
FIG. 3 depicts a flow diagram of an exemplary method for optimizing use of wireless communication protocols, in accordance with aspects herein.

FIG. 3 depicts a flow diagram of an exemplary method 300 for optimizing use of wireless communication protocols, which can occur in the order depicted herein or in any other order without departing from the scope of the technology herein. Furthermore, one or more steps can be added, omitted, or duplicated without departing from the scope of the technology described herein. As depicted in block 310, the method 300 can include determining that a first UE has established a first wireless communication link to a first node that uses a first wireless communication protocol. As described above, the first node can be determined to be an LTE node configured with 5G NSA capabilities such that it can connect with a NR node as a secondary node, while the LTE node serves as a master node. In some embodiments, the first wireless communication protocol can be 5G new radio (NR) and the second wireless communication protocol can be long term evolution (LTE). That is, the first node is configured according to NSA 5G protocol, such that LTE serves as a master wireless communication protocol and 5G NR serves as a secondary wireless communication protocol.

As depicted in block 312, some embodiments of method 300 include a step of determining that the first UE was previously connected to a second node that only utilizes the first wireless communication protocol, and that the first UE moved from the second node to the first node based on fallback or handover procedures. The second node can be, for example, a 5G node configured for 5G standalone (SA). In some embodiments, this step can include determining that the UE is attaching to the first node as a result of a handover or fallback procedure from a second node such as a 5G SA node. In some embodiments, the UE is connecting to the first node due to evolved packet system fallback (e.g., ESPFB) procedures and/or inter radio access technology handover (e.g., IRATHO) procedures. Thus, this step can require overlapping SA and LTE coverage in some embodiments, or overlapping of other various network types.

In some embodiments, as depicted in block 314 the method 300 can include a step of establishing a second wireless communication link between the first UE and the second node without analyzing signal information from the first UE. This step can occur in response to determining that the first UE was previously connected to the second node but moved to the first node because of a fallback or handover procedure. This can be referred to in some embodiments as a blind attach, and does not require any indications from measurement reports to determine whether the 5G NR node can be added as a secondary node for use by the UE (such as for internet browsing while a phone call is handled by a master node using LTE).

Additionally or alternatively, the method 300 can include a step of determining that a second UE is connected to the first node, then determining that, prior to connecting to the first node, the second UE was not previously connected to the second node that only utilizes the first wireless communication protocol. This step can be accomplished by monitoring incoming cause codes from the second UE. For example, in some aspects, determining that the second UE was not previously connected to the second node can be based on an absence of particular cause codes related to fallback or handover procedures associated with the first wireless communication protocol or an indication of a fresh attach of the second UE to the first node. In some aspects, the cause code indicates at least one of a voice call, an emergency services call, lack of adequate coverage, and lack of resources.

Furthermore, the method 300 can include obtaining a measurement report from the second UE to determine whether to assign the second UE to the first node, which would establish an NSA architecture. This step can be performed in response to determining that the second UE was not previously connected to the second node. The measurement report can indicate strength of signal, for example, to determine if adding 5G NR is a viable option at that time. Note that while the method steps of method 300 indicate steps for a first UE and a second UE, and of these steps can be performed solely by the first UE or solely by the second UE.

Figure 4:
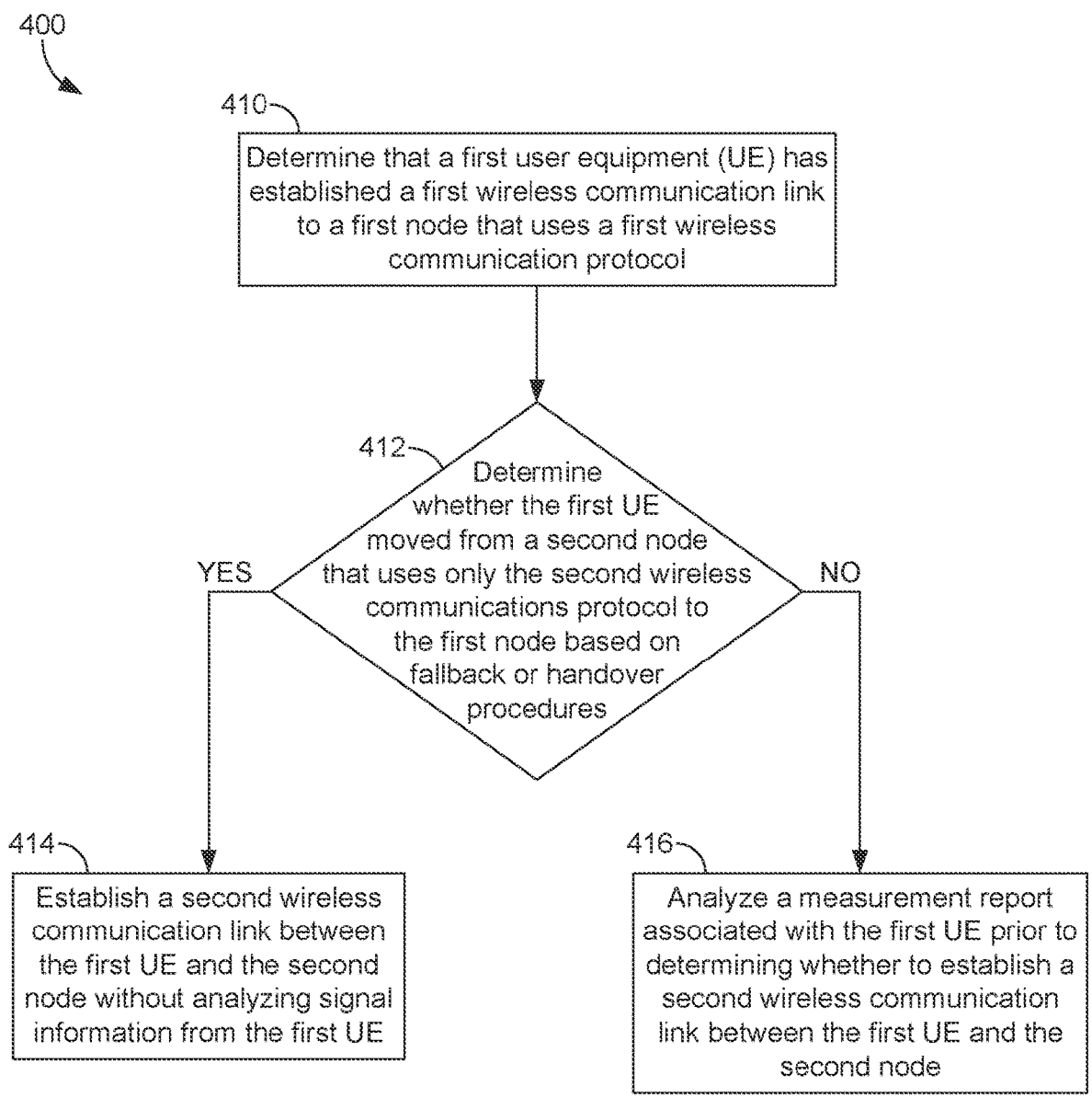
FIG. 4 depicts a flow diagram of an exemplary method for optimizing use of wireless communication protocols, in accordance with aspects herein.

FIG. 4 depicts yet another method 400 for optimizing use of wireless communication protocols. The method 400 can include the steps of determining that a first user UE has established a first wireless communication link to a first node that uses a first wireless communication protocol, as depicted in block 410. Further, method 400 may include determining whether the first UE moved from a second node that uses only the second wireless communications protocol to the first node based on fallback or handover procedures, as depicted in block 412. This determination can be made based on incoming cause codes, as noted above. For example, block 412 can include monitoring for an incoming cause code from the first UE, and determining that the first UE moved from the second node to the first node can be performed based on an incoming cause code indicating fallback or handover procedures caused the first UE to establish the first wireless communication link to the first node.

Furthermore, if it is determined at block 412 that the first UE moved from the second node to the first node based on fallback or handover procedures, the method 400 includes establishing a second wireless communication link between the first UE and the second node without analyzing signal information from the first UE, as depicted in block 414. This absence of analyzing signal information from the first UE refers to the blind attach methods described herein, where the measurement report is not used prior to assigning, for example, the 5G NR node as a secondary node. Similar to other embodiments above, the first wireless communication protocol can be 5G NR and the second wireless communication protocol can be LTE. Likewise, the first node can be configured according to NSA 5G protocol, such that LTE serves as a master wireless communication protocol and 5G NR serves as a secondary wireless communication protocol.

If it is determined that the first UE did not moved from the second node to the first mode because of fallback or handover procedures, a measurement report associated with the first UE is used to determine whether to establish a second wireless communication link between the first UE and the second node, shown at block 416.

Some embodiments of method 400 can include determining that a second UE has established a third wireless communication link to the first node that uses the first wireless communication protocol, and determining that the second UE did not move from the second node to the first node. For example, the second UE did not move from the second node to the first node if the second UE is a fresh attach (e.g., a phone that just turned on or just moved into a new geographic region associated with the first node). Furthermore, the method 400 can include a step of, based on determining that the second UE did not move from the second node to the first node, obtaining a measurement report from the second UE. The measurement reports can include signal strength readings from the second UE or other pertinent measurements obtained by the second UE. Then the method 400 can include a step of, in addition to the third wireless communication link, establishing a fourth wireless communication link between the second UE and the second node based on the measurement report. That is, the second UE can establish the second node or NR node as a secondary node while the first node or LTE node continues to function as a master node.

The method 300 can also include a step of establishing an interface connection between the first node and the second node. This interface connection provides for the first node to handle control functions and serve as the master node while the second node remains the secondary node. Note that while the method steps of method 300 indicate steps for a first UE and a second UE, and of these steps can be performed solely by the first UE or solely by the second UE.

Figure 5:
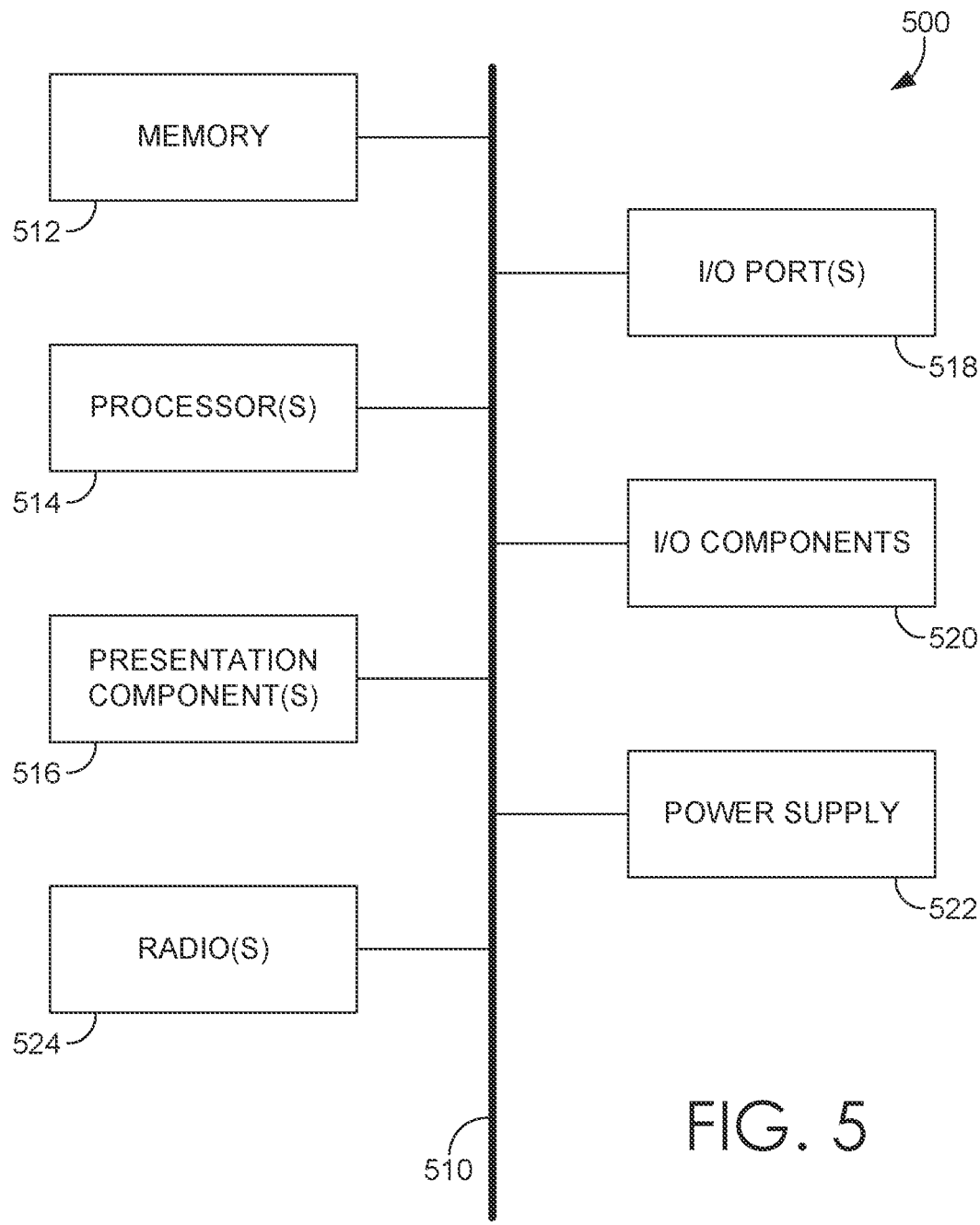
FIG. 5 depicts an exemplary computing environment suitable for use in implementations of the present disclosure.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, and power supply 514. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 512. One or more presentation components 508 presents data indications to a person or other device. Exemplary one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. Illustrative wireless telecommunications technologies include CDMA, GPRS, TDMA, GSM, and the like. Radio 516 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A method for optimizing use of wireless communication protocols, the method comprising:
   determining that a first user equipment (UE) has established a first wireless communication link to a first node that uses a first wireless communication protocol;
   determining that the establishment of the first wireless communication link was a handover having a cause code associated with a fallback procedure;
   determining that, prior to the handover, the first UE had a standalone connection to a second node that uses only the second wireless communications protocol, the first wireless communication protocol being different than the second wireless communication protocol; and
   based on the determination that the first UE had the standalone connection to the second node, creating a non-standalone communication session by designating the first node as a primary cell and adding a second wireless communication link between the first UE and the second node as a secondary cell without receiving a measurement report on signals transmitted from the secondary node after the handover.

2. The method of claim 1, further comprising:
determining that a second UE is connected to the first node;
determining that, prior to connecting to the first node, the second UE was not previously connected to the second node that only utilizes the first wireless communication protocol; and
in response to determining that the second UE was not previously connected to the second node, obtaining a measurement report associated with the second UE to determine whether establish a second wireless communication link between the second UE and the second node.

3. The method of claim 2, wherein the measurement report includes signal strength information associated with the second UE.

4. The method of claim 2, further comprising determining that the second UE was not previously connected to the second node based on at least one of an absence of particular cause codes related to fallback or handover procedures.

5. The method of claim 1, wherein the incoming cause code indicates at least one of a voice call, an emergency services call, lack of adequate coverage, or lack of resources.

6. The method of claim 1, wherein the fallback or handover procedures are at least one of an evolved packet system fallback (ESPFB) procedure or an inter radio access technology handover (IRATHO) procedure.

7. The method of claim 1, wherein the first wireless communication protocol is 5G new radio (NR) and the second wireless communication protocol is LTE.

8. The method of claim 7, wherein the first node is configured according to non-standalone (NSA) 5G protocol, such that the LTE serves as a master wireless communication protocol and the 5G NR serves as a secondary wireless communication protocol.

9. A non-transitory computer-readable media comprising executable instructions that, in response to execution, cause a network device comprising one or more processors to perform operations, the executable instructions comprising the steps of:
determining that a first user equipment (UE) has established a first wireless communication link to a first node that uses a first wireless communication protocol;
determining that the establishment of the first wireless communication link was a handover having a cause code associated with a fallback procedure;
determining that, prior to the handover, the first UE had a standalone connection to a second node that uses only the second wireless communications protocol, the first wireless communication protocol being different than the second wireless communication protocol; and
based on the determination that the first UE had the standalone connection to the second node, creating a non-standalone communication session by designating the first node as a primary cell and adding a second wireless communication link between the first UE and the second node as a secondary cell without receiving a measurement report on signals transmitted from the secondary node after the handover.

10. The computer-readable media of claim 9, wherein the executable instructions further comprise:
determining that a second UE has established a third wireless communication link to the first node that uses the first wireless communication protocol;
determining that the second UE did not move from the second node to the first node based on fallback or handover procedures; and
based on determining that the second UE did not move from the second node to the first node based on fallback or handover procedures, obtaining a measurement report associated with the second UE to determine whether to establish a fourth wireless communication link between the second UE and the second node.

11. The computer-readable media of claim 9, wherein the executable instructions further comprise establishing an interface connection between the first node and the second node.

12. The computer-readable media of claim 9, wherein the first wireless communication protocol is 5G and the second wireless communication protocol is LTE.

13. A method for optimizing use of wireless communication protocols, the method comprising:
determining that a first user equipment (UE) has established a first wireless communication link to a first node that uses a first wireless communication protocol;
determining that the establishment of the first wireless communication link was a handover having a cause code associated with a fallback procedure;
determining whether, prior to the handover, the first UE had a standalone connection to a second node that uses only the second wireless communications protocol, the first wireless communication protocol being different than the second wireless communication protocol;
if the first UE had the standalone connection to the second node, creating a non-standalone communication session by designating the first node as a primary cell and adding a second wireless communication link between the first UE and the second node without receiving a measurement report on signals transmitted from the secondary node after the handover; and
if the first UE did not have the standalone connection to the second node, analyzing a measurement report associated with the first UE prior to determining whether to establish a second wireless communication link between the first UE and the second node.

14. The method of claim 13, wherein the first wireless communication protocol is 5G and the second wireless communication protocol is LTE.

* * * * *